United States Patent
Aidun et al.

(10) Patent No.: US 7,933,987 B2
(45) Date of Patent: Apr. 26, 2011

(54) APPLICATION OF VIRTUAL SERVERS TO HIGH AVAILABILITY AND DISASTER RECOVERY SOLUTIONS

(75) Inventors: Mehrdad Aidun, Oak Hill, VA (US);
Corey S. Schwartz, Aptos, CA (US);
Matthew Brostek, Stafford, VA (US)

(73) Assignee: Lockheed Martin Corporation, Bethesda, MD (US)

( * ) Notice: Subject to any disclaimer, the term of this patent is extended or adjusted under 35 U.S.C. 154(b) by 994 days.

(21) Appl. No.: 11/534,473

(22) Filed: Sep. 22, 2006

(65) Prior Publication Data
US 2007/0078982 A1    Apr. 5, 2007

Related U.S. Application Data

(60) Provisional application No. 60/722,370, filed on Sep. 30, 2005.

(51) Int. Cl.
*G06F 15/173* (2006.01)
*G06F 15/16* (2006.01)
*G06F 11/00* (2006.01)

(52) U.S. Cl. ............. 709/224; 709/203; 709/250; 714/6

(58) Field of Classification Search .................. 709/203, 709/217–224, 250; 714/6
See application file for complete search history.

(56) References Cited

U.S. PATENT DOCUMENTS

| | | | |
|---|---|---|---|
| 5,504,861 A | 4/1996 | Crockett et al. | |
| 5,615,329 A | 3/1997 | Kern et al. | |
| 5,680,580 A | 10/1997 | Beardsley et al. | |
| 5,692,155 A | 11/1997 | Iskiyan et al. | |
| 5,734,818 A | 3/1998 | Kern et al. | |
| 5,832,222 A | 11/1998 | Dziadosz et al. | |
| 6,189,111 B1 | 2/2001 | Alexander et al. | |
| 6,725,253 B1 * | 4/2004 | Okano et al. | 709/203 |
| 6,732,294 B2 | 5/2004 | Mackrory et al. | |
| 7,143,307 B1 * | 11/2006 | Witte et al. | 714/6 |
| 7,370,228 B2 | 5/2008 | Takahashi et al. | |

(Continued)

OTHER PUBLICATIONS

Yi-Chen, Lan. A Framework for an Organization's Transition to Globalization—Investigation of IT Issues. Idea Group Inc. 2003.

*Primary Examiner* — Ian N Moore
*Assistant Examiner* — Kiet Tang
(74) *Attorney, Agent, or Firm* — Marsh Fischmann & Breyfogle LLP

(57) ABSTRACT

Server virtualization technology is applied to virtualize and encapsulate all unique information of a server as an image that is stored on a storage area network at one site and replicated on a storage area network at another site to provide high availability of system resources and data recovery capabilities. In one embodiment, a virtualized server system (100) includes a primary site (110), a secondary site (130), and a computer executable control application (150). The primary site (110) includes a storage area network (112), at least one primary virtual server platform (114), and at least one primary virtual server stored as at least one image (116) on the storage area network (112). The control application (150) directs replication of the primary virtual server image (116) onto a storage area network (132) at the secondary site (130) to create a corresponding replicated virtual server image (138). The control application (150) also monitors operation of the primary virtual server platform (114) and associates the replicated virtual server image (138) with a secondary virtual server (134) at the secondary site (130) in the event that a problem is detected with the primary site virtual server (114).

20 Claims, 8 Drawing Sheets

U.S. PATENT DOCUMENTS

| | | |
|---|---|---|
| 7,478,173 B1 * | 1/2009 | Delco .......................... 709/250 |
| 2003/0018927 A1 | 1/2003 | Gadir et al. |
| 2003/0074600 A1 | 4/2003 | Tamatsu |
| 2003/0126389 A1 | 7/2003 | Mackrory et al. |
| 2003/0188218 A1 | 10/2003 | Lubbers et al. |
| 2003/0188233 A1 | 10/2003 | Lubbers et al. |
| 2004/0034808 A1 | 2/2004 | Day, III et al. |
| 2004/0153708 A1 | 8/2004 | Joshi et al. |
| 2004/0243650 A1 | 12/2004 | McCrory et al. |
| 2005/0015657 A1 | 1/2005 | Sugiura et al. |
| 2005/0182910 A1 | 8/2005 | Stager et al. |
| 2006/0047896 A1 | 3/2006 | Nguyen et al. |

* cited by examiner

10 APPLICATIONS + LOCAL REDUNDANCY + DR SITE + LOCAL REDUNDANCY

| | TRADITIONAL APPROACH | | | VIRTUALIZED SERVER APPROACH | | | SAVINGS | |
|---|---|---|---|---|---|---|---|---|
| | PRIMARY SITE | DR SITE | TOTAL UNITS | PRIMARY SITE | DR SITE | TOTAL UNITS | IN UNITS | PERCENT |
| SERVER | 20 | 20 | 40 | 12 | 12 | 24 | 16 | 40% |
| OS LICENSES | 20 | 20 | 40 | 10 | 0 | 10 | 30 | 75% |
| APPLICATION LICENSES | 20 | 20 | 40 | 10 | 0 | 10 | 30 | 75% |
| DR SW LICENSES | 20 | 20 | 40 | 0 | 0 | 0 | 40 | 100% |
| OS PATCH UPDATE OVERHEAD | 20 | 20 | 40 | 10 | 0 | 10 | 30 | 75% |
| APPLICATION VERSION UPDATE OVERHEAD | 20 | 20 | 40 | 10 | 0 | 10 | 30 | 75% |
| DR PATCH UPDATE OVERHEAD | 20 | 20 | 40 | 0 | 0 | 0 | 40 | 100% |
| | | | | | | | | |
| SERVERS WITH MULTI-PURPOSE USE | 0 | 0 | 0 | 0 | 12 | 12 | | |

FIG.5

APPLICATION OF VIRTUAL SERVERS TO HIGH AVAILABILITY AND DISASTER RECOVERY SOLUTIONS

RELATED APPLICATION INFORMATION

This application claims priority from U.S. Provisional Application Ser. No. 60/722,370, entitled "APPLICATION OF VIRTUAL SERVERS TO HIGH AVAILABILITY AND DISASTER RECOVERY SOLUTIONS" filed on Sep. 30, 2005, which is incorporated by reference herein in its entirety.

FIELD OF THE INVENTION

The present invention relates generally to information technology systems, and more particularly to providing highly available and recoverable information technology systems.

BACKGROUND OF THE INVENTION

One manner of achieving a highly available and recoverable information technology system is employing multiple dedicated backup assets. Most if not all of the backup assets are inactive until they are activated in response to failure or disaster. Deploying such a system requires a combination of dedicated hardware, operating system (OS) software, disaster recovery (DR)/clustering middleware and application software at each recovery node for each application. For example, an application (e.g., Microsoft Exchange) would typically have a local recovery node and a global recovery node at a DR site. If a total of 3 nodes, two at the primary site and one at the DR site, are implemented, each node would be comprised of a hardware platform, an OS image, a DR/clustering middleware (e.g., Veritas), and an Exchange application. For this example, there are 2 dedicated recovery nodes that cannot be used for any other purpose. When application, OS or DR/clustering middleware patches/upgrades are released, each of the three nodes must be upgraded. If there are 5 Exchange servers in the enterprise, this translates to 15 nodes, each requiring their own dedicated server, each having a copy of the OS, application software, DR/clustering middleware and patch/upgrade management overhead.

Often, when application software and an associated OS are installed on a hardware platform, they are rigidly allocated to that platform. Typically to move this application software from one hardware platform to another, either DR/clustering middleware is used or the application software is re-provisioned at another hardware platform and application data from the original hardware platform is made available to the new platform. If this move is done across geographically dispersed locations and sub-nets, data replication and application Internet protocol (IP) change and domain name server (DNS) redirection further complicates the migration.

In many current implementations of local and global recovery, DR/clustering middleware software is used. All elements of each platform, from the input/output (I/O) cards up to the application processes, are a resource to the DR/clustering middleware software. Each platform has an agent installed through which all maintenance activities are performed. This agent has three main functional requirements: (1) it monitors all processes for the application and OS to assess its status; (2) it needs the capability to bring down the application gracefully; and (3) it needs the capability to boot up the application. To satisfy these functional requirements, there is a unique agent required for each application/OS combination. Typically, agents for popular applications/OS combinations are available by the DR/clustering middleware software provider; however, customers often have the development and maintenance responsibilities of the agents for the one off or non-popular application/OS combinations. The DR/clustering middleware software provider typically offers a development tool kit for development of the one off agents and there are consultants that can do the development for a fee. However, continuing maintenance, patch management and regression testing as OS, application or DR/clustering middleware patches and upgrades are introduced, are the responsibility of the enterprise. This translates to complexity and higher total cost of ownership (TCO).

Many technology providers offer tools and proprietary capabilities that reduce the operating and maintenance complexity of their products. However, to fully benefit from these tools and enhancements, typically a homogenous implementation of that product is required. For example, there are advantages and simplifications available if only one vendor's blade center is implemented throughout the IT system. However, if the enterprise wants to switch or mix hardware platforms, most likely the second vendor's set of tools and simplification methods are not compatible with the first vendor's.

This vendor dependency problem is more pronounced with the storage products. In general, procurement and maintenance of storage area network (SAN) products is an expensive commitment. Once a brand of SAN is implemented, there is a high cost barrier to change vendors since SAN from one vendor does not integrate/replicate with SAN from other vendors. Enterprises get locked into a vendor and have to use the same vendor's product for incremental capacity enhancements. Currently to switch SAN vendors, it has to be done in a wholesale fashion. Although new storage vendors with new simplifying innovations in scalability, performance, configuration and maintenance emerge on a regular basis, the inability to afford to phase one vendor out and another in is a large life cycle cost management concern.

SUMMARY OF THE INVENTION

Accordingly, the present invention provides for maintaining high availability and data recovery in information technology systems in the event of a disaster or other failure without the use of costly and complex DR/clustering middleware technologies while using a single image/license of the operating system and application software.

In accordance with the present invention, server virtualization technology, either hardware-based and/or software-based, is applied to virtualize all unique information of a server as an image that is stored on a storage area network. The server and storage area network may be located at a first location (also referred to herein as a primary site). The server image is independent of the underlying hardware and is locally available to other hardware. Additionally the server image is also replicated to a disaster recovery site (also referred to herein as a secondary site) and is available to hardware at that location to use and continue the operation of that application. A control application monitors the virtual servers and in the event of a hardware, software or other failure at the primary site, the control application brings the replicated image online on a server with adequate capacity. If this server is currently in use by a non-essential application, the control application may gracefully shut down the non-essential application prior to bringing the replicated operational application image online. Additionally, the control application manages the storage devices, replication of the server image(s), and handles updating the (DNS) servers if the IP address of the server changes.

The present invention achieves a number of advantages. One exemplary advantage is the ability to automatically failover between physical sites and multiple subnets between virtualized platforms that formerly had no means of being aware of each other's existence. Another exemplary advantage in relation to clustering technologies is that the present invention eliminates the need for a DR/clustering middleware SW and also eliminates the need for additional dedicated passive fail-over destination servers. Therefore, the enterprise operating the information technology system need only maintain one server image and one set of application and OS licenses. Another exemplary advantage is that the enterprise operating the information technology system does not need to keep the system homogenized in terms of hardware and software with additional spare systems. One more exemplary advantage is that in the event of a failure at the primary site, automated extended distance capabilities are provided.

According to one aspect of the present invention, a virtualized server system providing high availability of system resources and data recovery capabilities includes a primary site, a secondary site, and a controller. The primary site includes a primary site storage area network, at least one primary virtual server platform, and at least one primary site virtual server. The at least one primary site virtual server comprises application software, operating system software, and data, and the at least one primary site virtual server is stored as at least one primary virtual server image on the primary site storage area network. The at least one primary virtual server image is associated with the at least one primary virtual server platform. The secondary site includes a secondary site storage area network and at least one secondary virtual server platform, and the secondary site is enabled for data transmission with the primary site. The controller is operable to direct replication of the at least one primary virtual server image from the primary site to the secondary site storage area network. In this regard, a replicated virtual server image corresponding with the at least one primary virtual server image is stored on the secondary site storage area network. The controller is further operable to monitor operation of the at least one primary virtual server platform and to associate the at least one secondary virtual server platform with the at least one replicated virtual server image in the event that a problem is detected with the at least one primary virtual server platform.

According to another aspect of the present invention, a method of providing for high availability of information technology system resources and data recovery includes establishing at a primary site at least one primary site virtual server comprising application software, operating system software, and data. The at least one primary site virtual server is stored as at least one corresponding image on a storage area network at the primary site. The at least one stored image is associated with at least one primary virtual server platform at the primary site. The at least one image stored on the storage area network at the primary site is replicated on a storage area network at a secondary site. Operation of the at least one primary virtual server platform is monitored, and, the at least one replicated image at the secondary site is associated with at least one secondary virtual server platform at the secondary site in the event that a problem is detected with the at least one primary site virtual server platform.

These and other aspects and advantages of the present invention will be apparent upon review of the following Detailed Description when taken in conjunction with the accompanying figures.

DESCRIPTION OF THE DRAWINGS

For a more complete understanding of the present invention and further advantages thereof, reference is now made to the following Detailed Description, taken in conjunction with the drawings, in which:

FIG. 5 is a table comparing exemplary life cycle costs between a traditional system and a virtualized server system of the present invention.

DETAILED DESCRIPTION

Figure 1A:
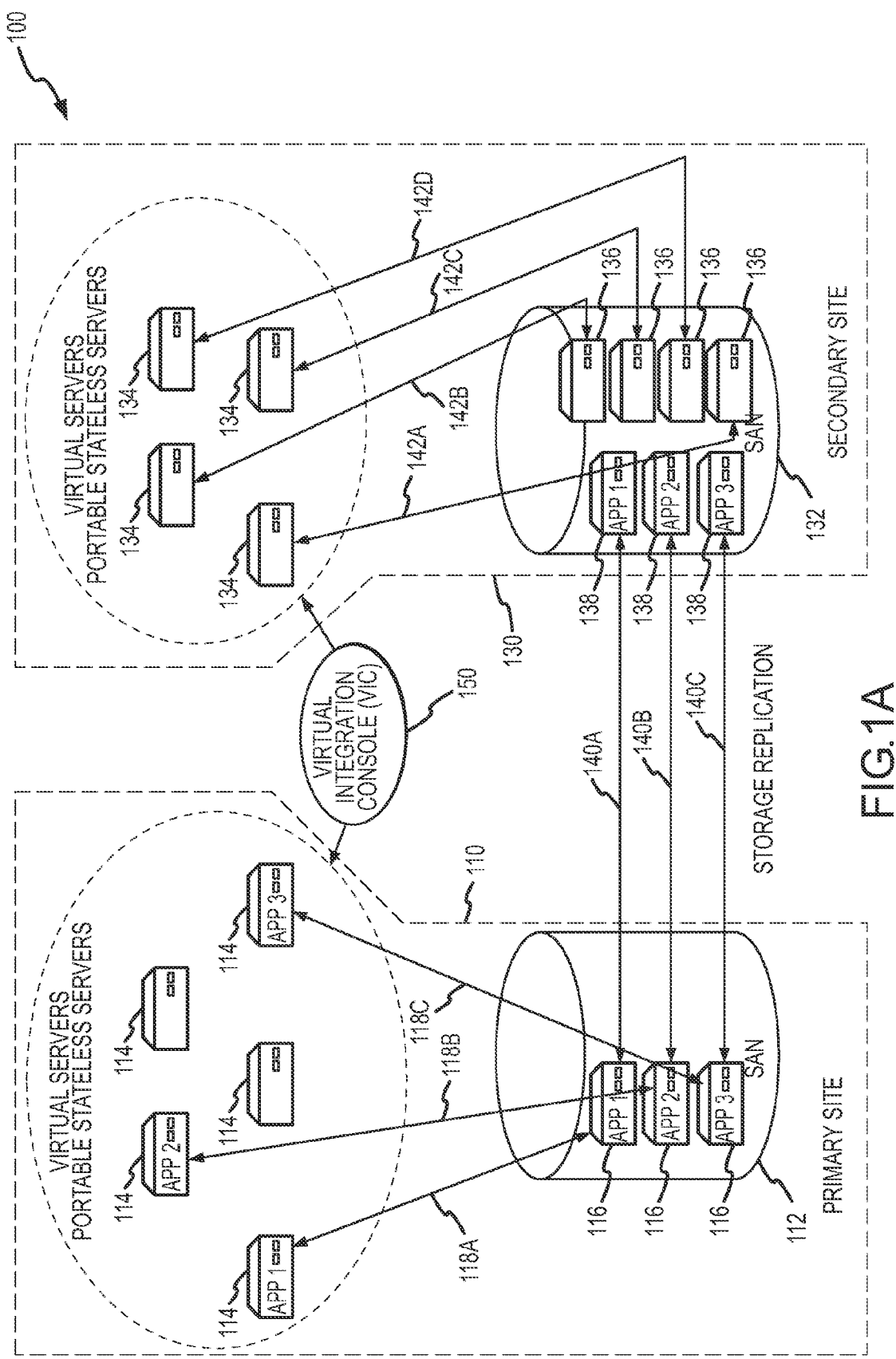
FIG. 1A is a block diagram showing one embodiment of a virtualized server system in accordance with the present invention.

FIG. 1A shows one embodiment of a virtualized server system 100 in an exemplary initial operating state. The virtualized server system 100 includes portions located at a primary site 110 and portions located at a secondary site 130. The primary site 110 may be geographically remote from the secondary site 130 such that an occurrence (e.g., an equipment failure, a power failure, a natural disaster, or a terrorist attack or other man-made event) effecting the operation of the portions of the system 100 at the primary site 110 may not necessarily effect the secondary site 130. Such an occurrence may be referred to herein as a "disaster event" and the secondary site 130 may also be referred to herein as the disaster recovery site 130. The primary site 110 and the secondary site 130 may, for example, be located in different buildings, in different towns, in different states, or even in different countries.

A storage area network (SAN) 112 is present at the primary site 110. SAN 112 may be referred to herein as the primary SAN 112. The primary SAN 112 (and other SANs included in various embodiments described herein), generally include a group of networked data storage devices (e.g., hard drives, CD or DVD drives, tape drives, flash memory devices, etc.) on which data may be stored and from which data may be retrieved using block input/output services. One example of a SAN appropriate for use in connection with the embodiments described herein is available from EMC Corporation presently headquartered in Hopkinton, Mass. In other embodiments, it may be possible to substitute one or more non-SAN devices for one or more of the SANs, such as storage devices utilizing file storage access methods.

The primary site 110 includes one or more virtual server platforms 114 (the primary virtual server platforms 114) associated therewith. The primary virtual server platforms 114 include physical hardware (e.g. a computer system) and server virtualization software. In the present embodiment, there are five primary virtual server platforms 114 at the primary site 110, although in other embodiments there may be fewer or more primary virtual server platforms 114 at the primary site 110.

One or more virtual servers are also present at the primary site 110. The primary site virtual servers may be implemented in the form of portable stateless servers. In this regard, a portable stateless server includes application software, operating system software, data created, updated or otherwise accessed by the application or operating system software, and information tying the application software, operating system software, and data to a particular physical hardware platform such as its network interface card (NIC) identifier(s) and media access control (MAC) address(es), all of which are encapsulated into a package. Encapsulating all of these elements into a single package permits such a package (a primary site virtual server) to be easily stored and copied. The primary site virtual servers (and other virtual servers included in various embodiments described herein) may be established using server virtualization software. One example of server virtualization software appropriate for use in connection with the embodiments described herein is available from VMware, Inc. presently headquartered in Palo Alto, Calif.

The primary site virtual servers are stored as images 116 on the primary SAN 112. In the present embodiment, there are three primary site virtual servers identified as "App 1", "App 2" and "App 3" referring to three applications, and hence, three primary virtual server images 116 are stored on the primary SAN 112. In other embodiments, there may be fewer or more than three primary site virtual servers and corresponding primary virtual server images 116. Each primary virtual server image 116 is associated with one of the primary virtual server platforms 114 as shown by arrows 118A-118C. The applications (App 1, App 2, App 3) execute on their respective associated primary virtual server platforms 114. Since there are only three primary site virtual servers and corresponding primary virtual server images 116, there are two excess primary virtual server platforms 114 at the primary site 110. In other embodiments, there may be fewer or more excess primary virtual server platforms 114, including no excess primary virtual server platforms 114, at the primary site 110. Additionally in other embodiments, there may be more than one primary virtual server image 116 associated with and running on a given virtual server platform 114. For sake of clarity, a maximum of one virtual server per virtual server platform is used throughout this description of the present embodiment.

The secondary site 130 is configured similar to the primary site 110. In this regard, a SAN 132 is present at the secondary site 130. SAN 132 may be referred to herein as the secondary SAN 132. The secondary site 130 includes one or more virtual server platforms 134 (the secondary virtual server platforms 134) associated therewith. The secondary virtual server platforms 134 include physical hardware (e.g., a computer system) and server virtualization software. In the present embodiment, there are four secondary virtual server platforms 134 shown, but in other embodiments there may be fewer or more secondary virtual server platforms 134 present at the secondary site 130.

One or more virtual servers (e.g., four) are also present at the secondary site 130. The secondary site virtual servers may be implemented in the form of portable stateless servers and are stored as images 136 (the secondary images 136) on the secondary SAN 132. In the present embodiment, there is the same number of secondary site virtual server images 136 as the number of secondary virtual server platforms 134, but in other embodiments, there may be fewer or more secondary site virtual server images 136 than secondary virtual server platforms 134.

In addition to the secondary images 136, the primary images 116 stored on the primary SAN 112 are replicated as images 138 (the replicated virtual server images 138) on the secondary SAN 132. As shown by arrows 140A-140C, there may be a one-to-one correspondence between the replicated virtual server images 138 on the secondary SAN 132 and the primary virtual server images 116 on the primary SAN 112. As shown by arrows 142A-142D, each secondary virtual server image 136 is associated with one of the secondary virtual server platforms 134. The replicated virtual server images 138 are not initially associated with any of the secondary virtual server platforms 134.

The virtualized server system 100 also includes a virtual integration console 150 (VIC 150). In one embodiment, VIC 150 is implemented in software executable by a computer processor, and there are instances of VIC 150 executing on computer systems at both the primary and the secondary sites 110, 130. In other embodiments, VIC 150 may be executing in only one location (e.g., the primary site, the secondary site, or a site remote from both the primary and secondary sites), and it may be implemented in hardware or a combination of hardware and software. Each instance of VIC 150 interfaces with the other instances of VIC 150, and in FIG. 1 both instances of VIC 150 are represented as a single block. VIC 150 directs the replication of the primary virtual server images 116 from the primary SAN 112 to the replicated virtual server images 138 on the secondary SAN 132. VIC 150 also monitors operation of the primary virtual server platforms 114. If a failure is detected with one of the primary virtual server platforms 114, VIC 150 directs appropriate action at the primary site 110 and/or the secondary site 130 to ensure that the applications (e.g., App 1, App 2, and App 3) executing on the primary virtual server platforms 114 continue to operate and that critical data is not lost.

Figure 1B:
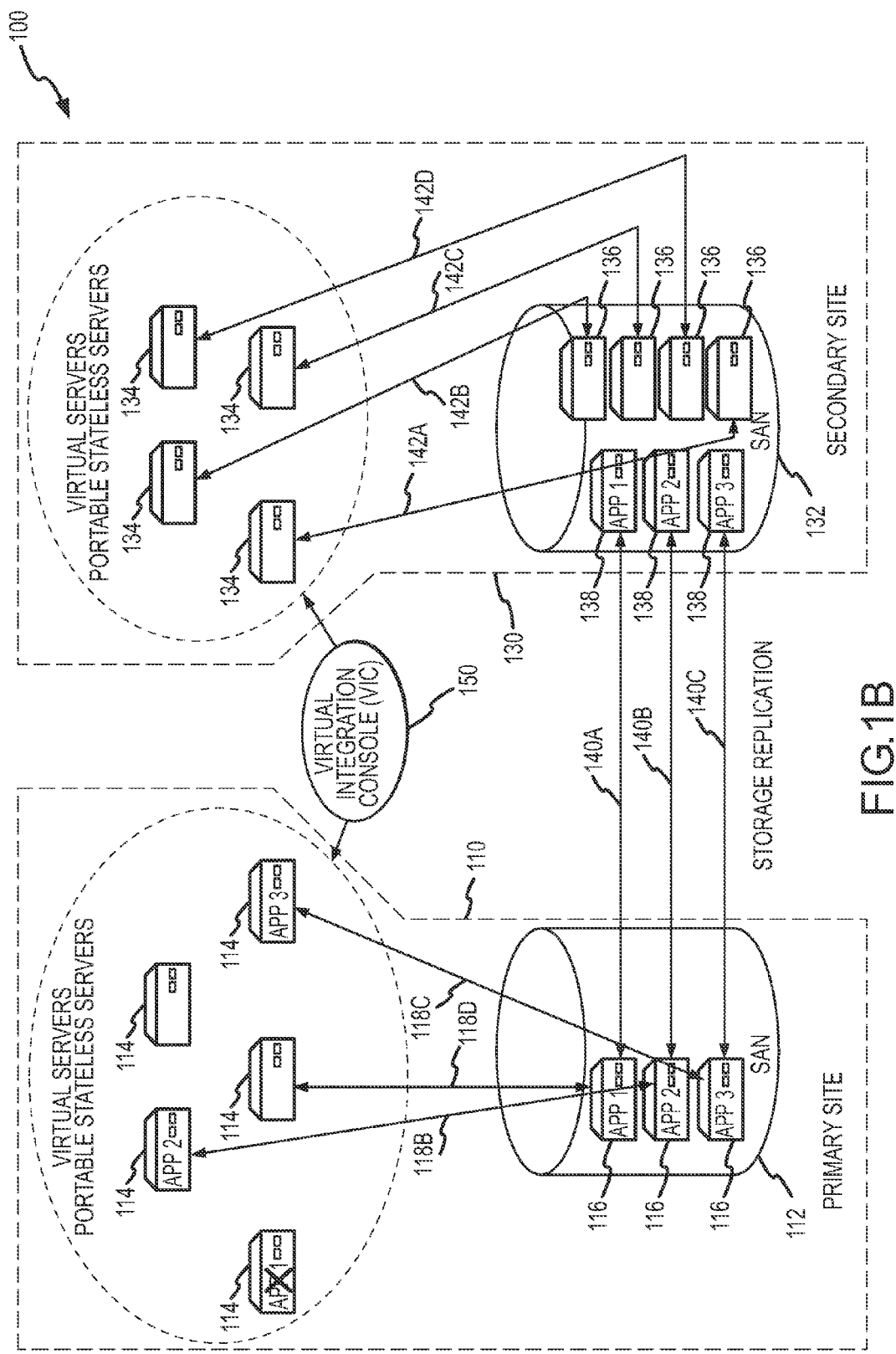
FIGS. 1B-1D are block diagrams showing exemplary operation of a virtualized server system such as shown in FIG. 1A.
Figure 1C:
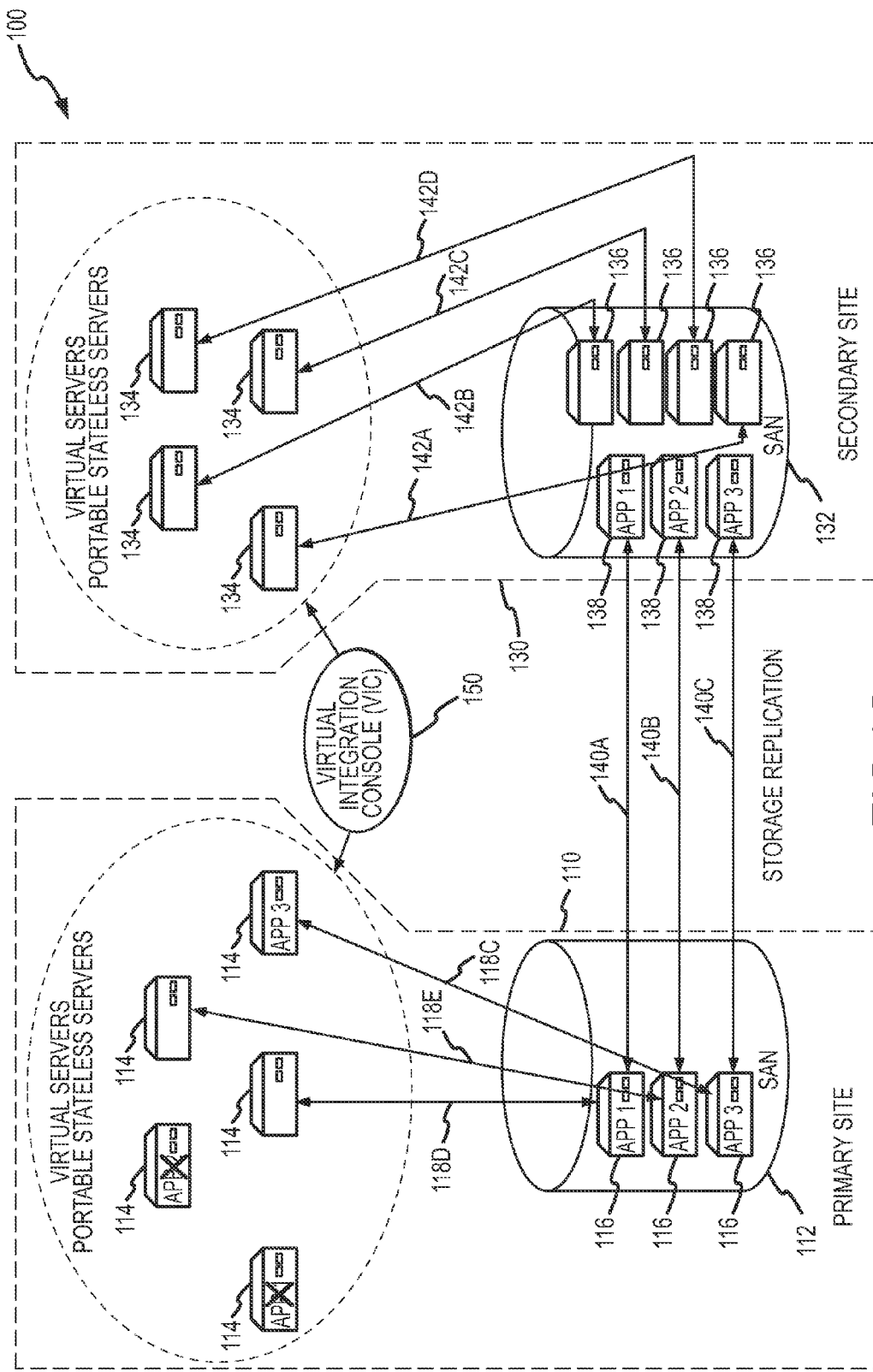
Figure 1D:
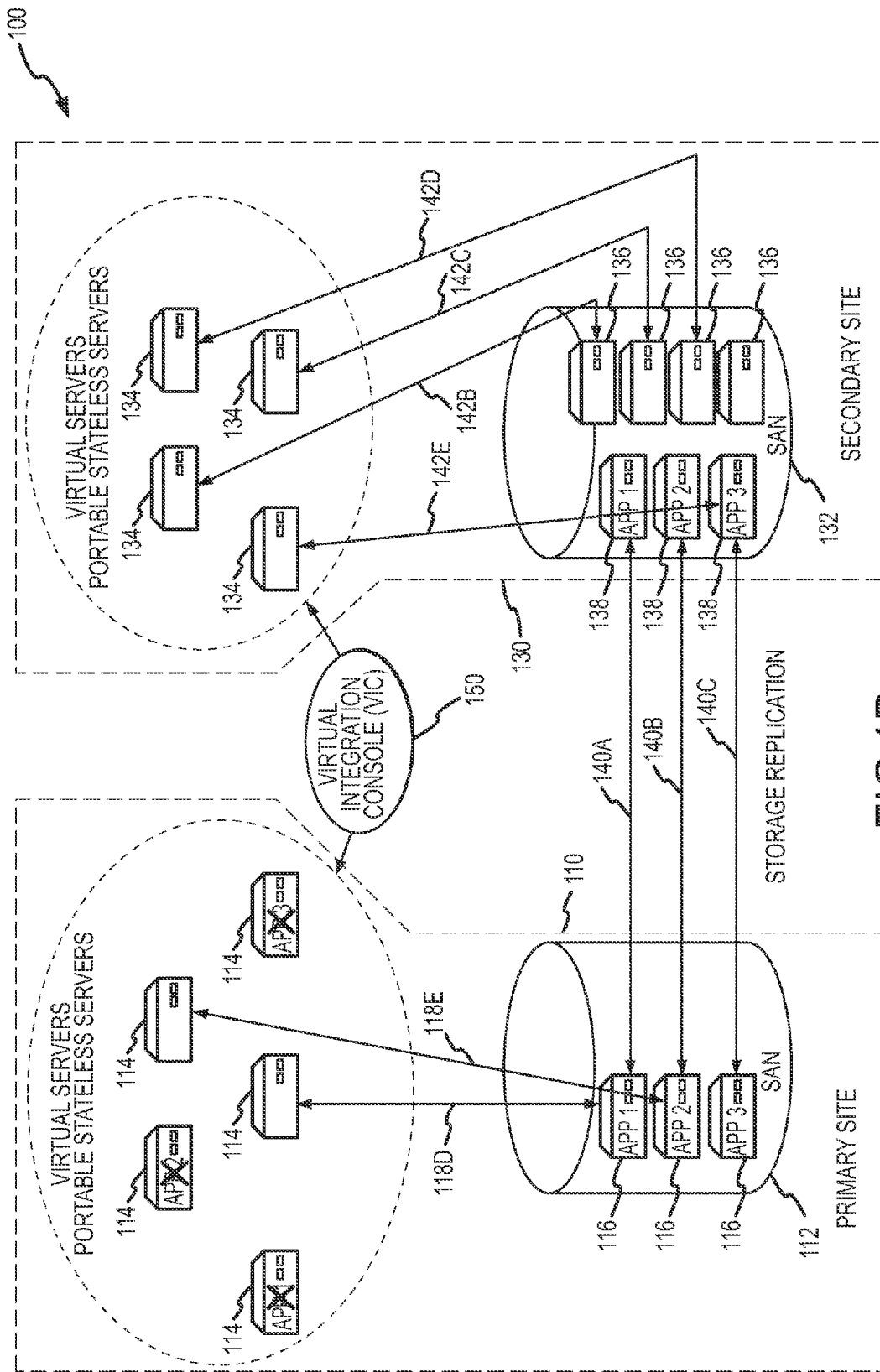

FIGS. 1B-1D show a series of exemplary actions directed by VIC 150 upon the occurrence of one or more disaster events effecting operations at the primary site 110. As shown in FIG. 1B by arrow 118D, if there is a problem with the primary virtual server platform 114 on which App 1 is executing, VIC 150 redirects the association of the primary virtual server image 116 including App 1 to one of the excess primary virtual server platforms 114 for execution of App 1 thereon. As shown in FIG. 1C by arrow 118E, if there is then a problem with the primary virtual server platform 114 on which App 2 is executing, VIC 150 redirects the association of the primary virtual server image 116 including App 2 to the other excess primary virtual server platform 114 for execution of App 2 thereon. As shown in FIG. 1D by arrow 142E, if there is then a problem with the virtual server platform 114 on which App 3 is executing, since there are no more excess primary virtual server platforms 114, VIC 150 brings the appropriate replicated virtual server image 138 online at the secondary site 130 in place of the primary virtual server image 116 associated with the failed primary virtual server platform 114 at the primary site 110.

Where non-essential applications are currently executing on one or more of the secondary virtual server platforms 134, VIC 150 may direct such applications to shutdown prior to bringing the replicated virtual server image(s) 138 online. For example, as shown by the removal of arrow 142A in FIG. 1D, where one of the secondary virtual server platforms 134 is associated with a secondary virtual server image 136, VIC 150 may shut the application(s) associated with such secondary virtual server image 136 down before associating the replicated virtual server image 138 with the same secondary virtual server platform 134 in order to make the secondary virtual server platform 134 resource available to support execution of the application included in the replicated virtual server image 138.

Although not shown in FIGS. 1A-1D, when necessary due for example to a catastrophic failure at the primary site 110, VIC 150 may bring each of the replicated virtual server images 138 online at the secondary site 130. In this regard, there may be sufficient secondary virtual server platform 134 resources located at the secondary site 130 to support bringing all replicated virtual server images 138 online concurrently. Further, although not shown in FIGS. 1A-1D, it is possible for a single primary or secondary virtual server platform 114, 134 to be configured to concurrently support more than one primary virtual server image 116, secondary virtual server image 136, or replicated virtual server image 138.

Although not shown in FIGS. 1A-1D, VIC 150 can be configured so a sub-set of the virtual servers are recoverable at the secondary site 130. This allows for situations where, during disaster recovery operations, the full set of virtual servers are not needed, or, due to other architectural reasons, recovering a full set of virtual servers is not feasible. In this regard, for example, domain controllers are typically not included among a set of virtual servers that are recovered at the secondary site 130 since separate domain controllers are generally already implemented at different sub-nets and the domain controller from one sub-net (e.g., the primary site 110) should not be recovered at a different sub-net (e.g., the secondary site 130). Additionally, VIC 150 can be configured to allow a relationship, a dependency or a sequence based on which of the replicated virtual server images 138 are brought on line. Further VIC 150 can allow for various logical dependencies among virtual servers, grouping of virtual servers into different operational combinations, and different degrees of access control to the virtual servers.

Although not shown in FIGS. 1A-1D, since any available virtual server platform with sufficient capacity can be used as a backup to any other failed virtual server platform, only one additional spare virtual server platform capacity may be required for failure recovery. To be conservative an additional second spare virtual server platform capacity may be used. This is the basis for the N+2 recovery platform model achieved by embodiments of the present invention, where N is the number of virtual server platforms in operation and 2 is the number of spare virtual server platforms/capacity. The key advantage is that the number of spare virtual server platform stays the same regardless of the value of N. A traditional approach using DR/clustering middleware, requires one platform for each recovery node for each server, translating into a N+N model. Thus, the N+2 model provides significant savings over the N+N model and these savings are multiplied when applied to additional sites such as a DR site.

Figure 2:
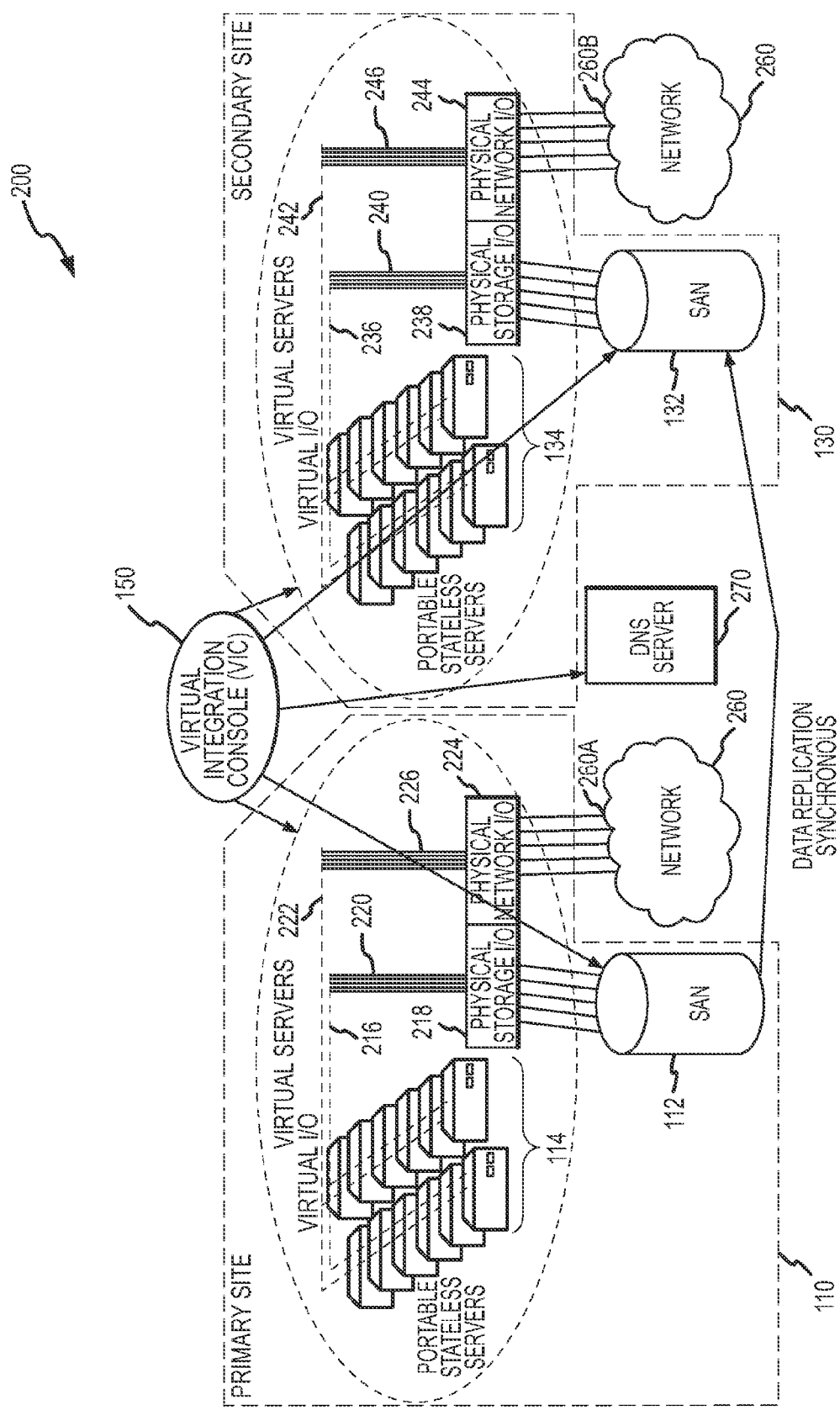
FIG. 2 is a block diagram showing another embodiment of a virtualized server system in accordance with the present invention.

FIG. 2 shows another embodiment of a virtualized server system 200. As with the virtualized server system 100 of FIG. 1A, the virtualized server system 200 of FIG. 2 has a number of desirable characteristics including zero data loss, fast data recovery and operational resumption times, automatic failover, and application independence, and is a hardware/software based solution requiring no DR/clustering middleware. The virtualized server system 200 of FIG. 2 includes a number of elements in common with and operates in a similar manner to the virtualized server system 100 of FIG. 1 and corresponding elements are referenced using the same numerals.

In the virtualized server system 200 of FIG. 2, the primary virtual server platforms 114 communicate with the primary SAN 112 via a primary virtual input/output (I/O) channel 216 connected with a primary physical storage interface 218 including one or more primary physical storage I/O channels 220. In this regard, there may be a number of primary physical storage I/O channels 220 to provide a parallel interface between the primary virtual storage I/O channel 216 and the primary SAN 112. The primary virtual I/O channel 216, primary physical storage interface 218 and primary physical storage I/O channels 220 allow for storing primary virtual server images (not shown in FIG. 2) associated with the primary virtual server platforms 114 on the primary SAN 112.

The primary virtual server platforms 114 also communicate with a first location 260A on a network 260 via a primary virtual network I/O channel 222 connected with a primary physical network interface 224 including one or more primary physical network I/O channels 226. The network 260 may be a publicly accessible network, a private network, or a combination of public and private networks, including both local area and wide area networks incorporating wired and/or wireless network connections. There may be a number of primary physical network I/O channels 224 in order to provide parallel communication capacity between the primary virtual server platforms 114 and the network 260. The primary virtual network I/O channel 222, primary physical network interface 224 and primary physical network I/O channels 226 allow for access between the network 260 and the primary virtual server platforms 114.

The secondary virtual server platforms 134 communicate with the secondary SAN 132 via a secondary virtual storage input/output (I/O) channel 236 connected with a secondary physical storage interface 238 including one or more secondary physical storage I/O channels 240. There may be a number of secondary physical storage I/O channels 240 to provide a parallel interface between the secondary virtual storage I/O channel 236 and the secondary SAN 132. The secondary virtual I/O channel 236, secondary physical storage interface 238 and secondary physical storage I/O channels 240 allow for storing secondary virtual server images (not shown in FIG. 2) corresponding with the secondary virtual server platforms 134 on the secondary SAN 132 as well as replicated virtual server images (not shown in FIG. 2) corresponding with the primary virtual server images on the secondary SAN 132.

The secondary virtual server platforms 134 also communicate with a second location 260B on network 260 via a secondary virtual network I/O channel 242 connected with a secondary physical network interface 244 including one or more secondary physical network I/O channels 246. In this regard, the second location 260B on network 260 may be identified by a different network address than the first location 260A on the network 260. There may be a number of secondary physical network I/O channels 246 in order to provide parallel communication capacity between the secondary virtual server platforms 134 and the network 260. The secondary virtual network I/O channel 242, secondary physical network interface 244 and secondary physical network I/O channels 246 allow for access between the network 260 and the primary virtual servers 114.

VIC 150 directs replication of the primary virtual server images from the primary SAN 112 to the replicated virtual server images on the secondary SAN 132 to occur in a synchronous manner. In this regard, as data virtualized in one of the primary virtual server platforms 114 is written to the primary SAN 112, such data is also written to the secondary SAN 132 and confirmation that the data replication operation has been completed is provided by the secondary SAN 132 to the primary SAN 112. The data to be replicated and confirmation of completion of its replication on the secondary SAN 132 may be transmitted between the primary site 110 and secondary site 130 via the network 260. Thus, the primary site 110 and secondary site 130 may be sufficiently proximate to one another (e.g., within 100 km of one another) such that the packet delay over the network 260 is minimal so that users do not experience unacceptable delays in the operation of primary site 110 applications during the data writing process.

In addition to controlling the data replication process between the primary and secondary sites 110, 130, as with the virtualized server system 100 embodiment of FIG. 1A, VIC 150 also monitors operation of the primary virtual servers 114, and if a failure is detected with one of the primary site virtual server platforms 114, VIC 150 re-associates the appropriate primary virtual server image(s) with an available primary virtual server platform(s) 114 and/or brings the appropriate replicated virtual server image(s) online in place of the primary virtual server image(s) corresponding with the failed primary virtual server platform 114. As part of re-associating or bringing the appropriate secondary image(s) online, VIC updates the network address information on one or more domain name servers 270 (DNSs) to direct resources interacting with the failed primary virtual server platform 114 to the appropriate excess primary virtual server platform 114 or secondary virtual server platform 134. Also, as with the embodiment shown in FIG. 1A, VIC 150 may shutdown unnecessary applications at the secondary site 130.

Figure 3:
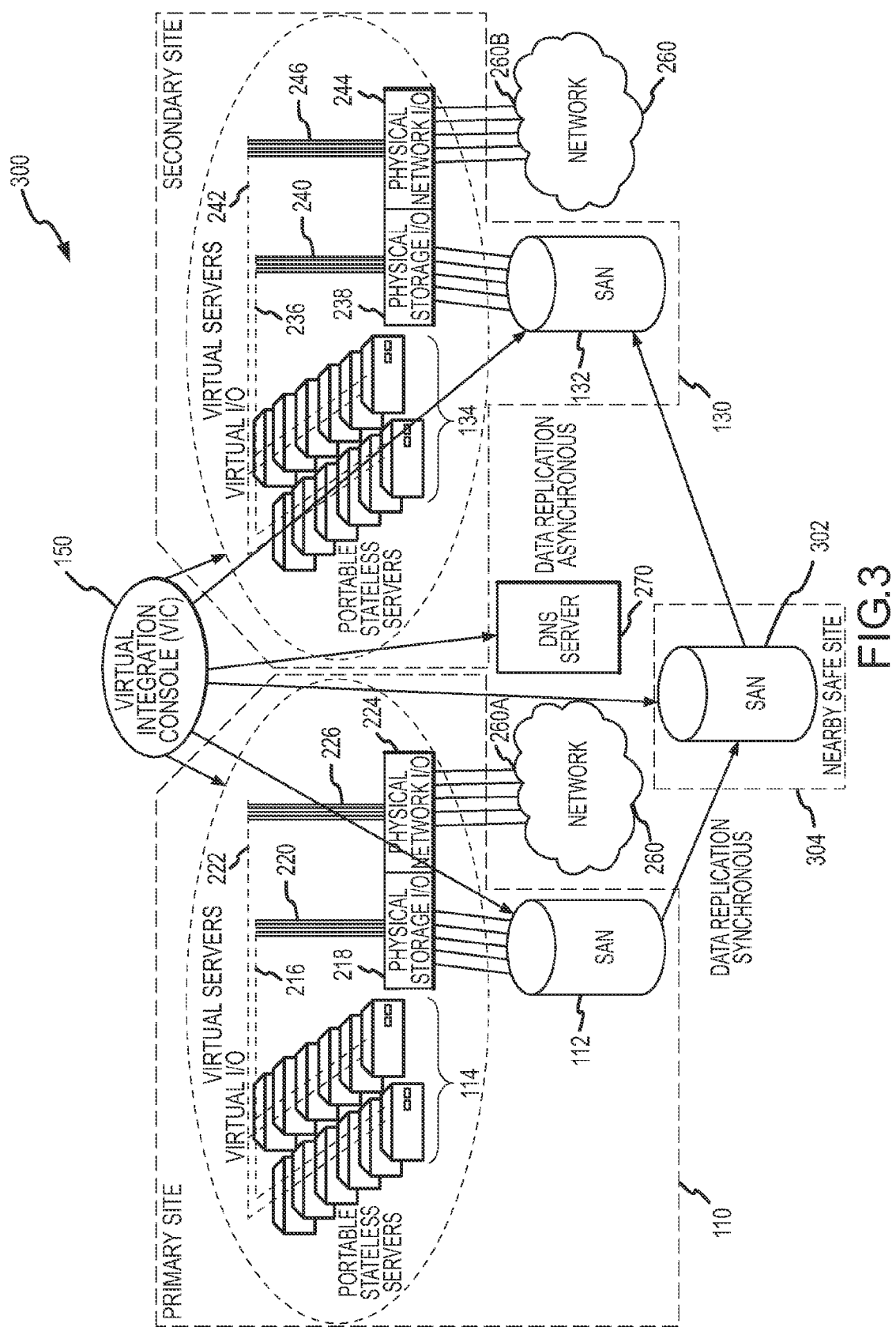
FIG. 3 is a block diagram showing a further embodiment of a virtualized server system in accordance with the present invention.

FIG. 3 shows another embodiment of a virtualized server system 300. As with the virtualized server systems 100, 200 of FIGS. 1A and 2, the virtualized server system 300 of FIG. 3 has a number of desirable characteristics including zero data loss, fast data recovery and operational resumption times, automatic failover, and application independence, and is a hardware/software based solution requiring no DR/clustering middleware. Additionally, the virtualized server system 300 of FIG. 3 is configured for extended distance situations where the primary and secondary sites 110, 130 are sufficiently distant (e.g., more than 100 km) from one another that a packet delay time between the primary and secondary sites 110, 130 is unacceptably long in duration. Further, the virtualized server system 300 also allows disaster recovery assets at the secondary site 130 to be available for other uses until a disaster event occurs requiring the assets to be made fully available for operational continuity and recovery purposes. The virtualized server system 300 of FIG. 3 includes a number of elements in common with and operates in a similar manner to the virtualized server systems 100, 200 of FIGS. 1A and 2, and corresponding elements are referenced using the same numerals.

The virtualized server system 300 of FIG. 3 includes an intermediary SAN 302 located at a nearby safe site 304. The intermediary SAN 302 is connected through an interface (not shown) to the network 260. VIC 150 also includes an instance thereof executing on a computer system (not shown) located at the nearby safe site 304. VIC 150 directs synchronous replication of the primary virtual server images (not shown in FIG. 3) from the primary SAN 112 onto the intermediary SAN 302. In this regard, as data virtualized in one of the primary virtual server images is written to the primary SAN 112, such data is also written to the intermediary SAN 302 and confirmation that the data replication operation has been completed is provided by the intermediary SAN 302 to the primary SAN 112. The data to be replicated and confirmation of completion of its replication on the intermediary SAN 132 may be transmitted between the primary site 110 and nearby site 304 via the network 260. Thus, the primary site 110 and nearby site 304 should be sufficiently proximate to one another (e.g., within 100 km of one another) such that the packet delay over the network 260 is minimal so that there is no impact to the operation of primary site 110 applications during the data writing process.

In addition to directing synchronous data replication between the primary and nearby safe sites 110, 304, VIC 150 also directs asynchronous data replication between the nearby safe site 304 and the secondary site 130. In this regard, the primary virtual server images synchronously replicated on the intermediary SAN 302 are copied to the secondary SAN 132 when resources at the nearby safe and secondary sites 304, 130 are available. Since primary site 110 applications are not waiting for confirmation that the data has been properly replicated at the secondary site 130, an extended packet delay between the nearby safe and secondary sites 304, 130 during the replication process therebetween is acceptable.

As in other embodiments, VIC 150 also monitors operation of the primary virtual server platforms 114. If a failure is detected with one of the primary virtual server platforms 114, VIC 150 brings the appropriate replicated image online at the secondary site in place of the primary image corresponding with the failed primary virtual server platform 114 on the primary SAN 112. In this regard, where the asynchronous data replication process between the nearby safe and secondary sites 304, 130 has not yet been completed, VIC 150 may temporarily bring one or more replicated images online from the intermediary SAN 302 as needed until such time as the asynchronous data replication process is completed and the replicated images are fully available at the secondary site 130. Further, where excess primary virtual server platform 114 resources are available at the primary site 110, VIC 150 may redirect association of the primary virtual server image to one of the excess primary virtual server platforms 114 before bringing replicated images online at the secondary site 130 and/or temporarily at the nearby safe site 304.

Figure 4:
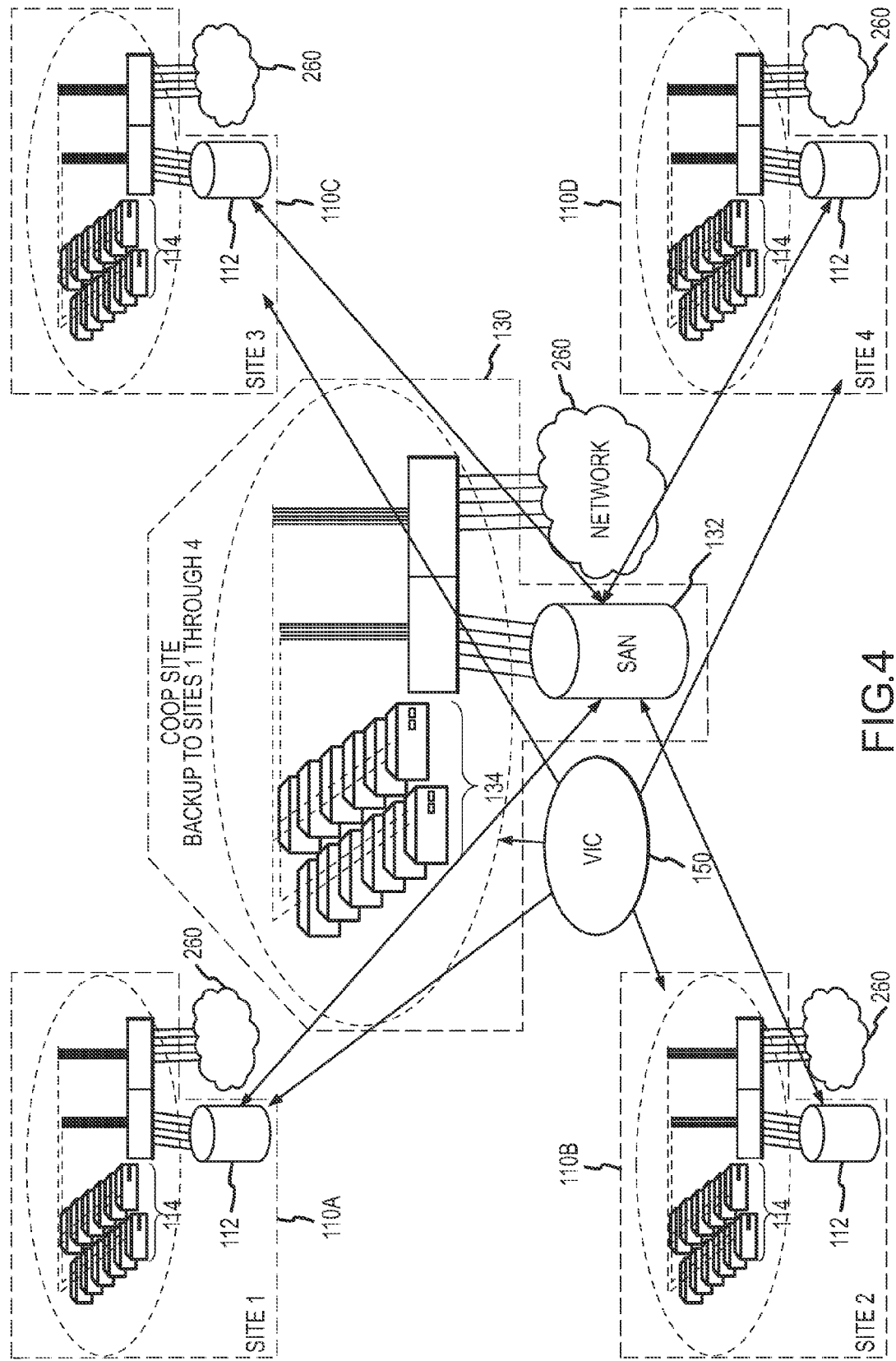
FIG. 4 is a block diagram showing one more embodiment of a virtualized server system in accordance with the present invention.

Referring to FIG. 4, the concepts represented in the virtualized server systems 100, 200 and 300 of FIGS. 1A-1D, 2 and 3 can be extended to include two or more primary sites backed up by a single secondary site. One example of such a system is depicted in FIG. 4 which shows a virtualized server system 400 including four primary sites 110A-110D (Site 1, Site 2, Site 3 and Site 4) and one secondary site 130. The secondary site 130 is referred to as a continuity of operations (COOP) site since it co-operatively backs-up multiple primary sites 110A-110D. Since the secondary SAN 132 at the secondary site 130 will have replicated images from four primary sites 110A-110D, the data storage capacity of the secondary SAN 132 may need to equal or exceed the combined data storage capacity of the primary SANs 112, although where it is anticipated that the entire storage capacity of one or more of the primary SANs 112 will not be fully utilized or where data compression techniques can be applied when storing the replicated data, it may be possible for the secondary SAN 132 to have a data storage capacity that is less than the combined data storage capacity of the primary SANs 112.

Instances of VIC 150 executing on computer systems (not shown) at each of the primary sites 110A-110D and the secondary site 130, direct replication of data from the primary SANs 112 at each of the primary sites 110A-110D to the secondary SAN 132 at the common secondary site 130. In this regard, in the virtualized server system 400 of FIG. 4, each primary site 110A-110D is sufficiently proximate (e.g., within 100 km) of the secondary site 130 so that data replication is accomplished synchronously between each primary site 110A-110D and the secondary site 130 via network 260. However, although not shown in FIG. 4, it is possible for one or more of the primary sites 110A-110D to be located too far from the secondary site 130 to permit direct synchronous data replication therebetween. In such instance, an intermediary site (not shown) may be employed between each of primary sites 110A-110D that is located too far from the secondary site 130 in a manner similar to that shown in the virtualized server system 300 of FIG. 3. In addition to directing data replication, VIC 150 monitors the status of the primary virtual server platforms 114 at each primary site 110A-110D, and when a failure is detected, the appropriate primary virtual server images (not shown in FIG. 4) on respective primary SANs 112 are re-associated with respective available excess primary virtual server platform 114 resources and/or corresponding replicated virtual server images (not shown in FIG. 4) on the secondary SAN 132 are brought online at the secondary site 130 with VIC 150 updating network address information as necessary with one or more DNSs (not shown). The COOP site assets can also be used where a planned activity at any of the primary sites 110A-110D could cause operational interruption. Temporarily moving such operations to COOP site assets allows the servers at any of the primary sites 110A-110D to be available for repair, maintenance or simply lifecycle replacement.

FIG. 5 shows a table 500 comparing life cycle costs for a traditional data recovery system in which server virtualization is not used while DR/clustering middleware is used and a data recovery system employing virtualized server systems such as the virtualized server systems 100, 200, 300, 400 of FIGS. 1A-1D, 2, 3 and 4. In the exemplary table, the presence of ten applications at the primary site has been assumed. For each application, the traditional data recovery system approach involves local redundancy at both the primary site and the disaster recovery site. The number of servers, OS licenses, application licenses, DR/clustering middleware software licenses, OS patch update overhead, application version update overhead, and DR/clustering middleware software patch update overhead at the primary site, the DR site, and the total combined units at each site required for the traditional approach is shown in the second, third and fourth columns 502, 504, 506 of the table 500. The number of servers, OS licenses, application licenses, DR/clustering middleware software licenses, OS patch update overhead, application version update overhead, and DR/clustering middleware software patch update overhead at the primary site, the DR site, and the total combined units at each site required for the virtualized server system approach is shown in the fifth, sixth and seventh columns 508, 510, 512 of the table 500. In this regard, the virtualized server approach only requires two redundant servers at each of the primary and DR sites as opposed to ten redundant servers at each site under the traditional approach, does not require any redundant OS licenses, application licenses, OS patch update overhead or application version update overhead at the primary site, does not require any DR/clustering middleware SW licenses or DR/clustering middleware software patch update overhead at the primary site, and requires no OS licenses, application licenses, DR/clustering middleware software licenses, OS patch update overhead, application version update overhead, and DR/clustering middleware software patch update overhead at the DR site. The savings realized by the virtualized server system approach relative to the traditional approach in the number of servers, OS licenses, application licenses, DR/clustering middleware software licenses, OS patch update overhead, application version update overhead, and DR/clustering middleware software patch update overhead in units and in percentage terms is shown in the eighth and ninth columns 514 and 516 of the table 500. In addition to the cost savings realized with the virtualized server approach summarized in the eighth and ninth columns 514, 516 of the table 500, the virtualized server approach also includes twelve servers at the DR site that are multi-purpose (e.g., such servers are available to support other resources when not required to be available to provide operational continuity and data recovery in the event of a problem or failure at the primary site).

While various embodiments of the present invention have been described in detail, further modifications and adaptations of the invention may occur to those skilled in the art. However, it is to be expressly understood that such modifications and adaptations are within the spirit and scope of the present invention.

What is claimed is:

1. A virtualized server system providing high availability of system resources and data recovery capabilities, said system comprising:

a primary site including a primary site storage area network, at least one primary virtual server platform including physical hardware and server virtualization software, and at least one primary site virtual server, said at least one primary site virtual server being implemented as a portable stateless server comprising an encapsulated package established by the server virtualization software, the encapsulated package including application software, operating system software, application data, and information tying the application software, the operating system software and the application data to particular physical hardware of the at least one primary virtual server platform including any NIC identifiers of the physical hardware and any MAC addresses associated therewith, said at least one primary site virtual server further including its own NIC identifier and MAC address and being stored as at least one primary virtual server image of the encapsulated package on said primary site storage area network, said at least one primary virtual server image being associated with said at least one primary virtual server platform;

a secondary site enabled for data transmission with said primary site, said secondary site including a secondary site storage area network and at least one secondary virtual server platform including physical hardware and server virtualization software;

at least one excess virtual server platform including physical hardware and server virtualization software, said at least one excess virtual server platform being located at one of said primary and secondary sites; and a controller operable to direct replication of said at least one primary virtual server image from said primary site to said secondary site storage area network wherein a replicated virtual server image corresponding with said at least one primary virtual server image is stored on said secondary site storage area network;

said controller being further operable to monitor operation of said at least one primary virtual server platform and, in the event that a problem is detected with said at least one primary virtual server platform, to re-associate said at least one primary virtual server image with said at least one excess virtual server platform if said at least one excess virtual server platform is available or associate said at least one secondary virtual server platform with said at least one replicated virtual server image, and when said at least one secondary virtual server platform is associated with at least one secondary virtual server implemented as a portable stateless server and stored as at least one secondary virtual server image on the secondary site storage area network, said controller being further operable to shutdown a non-essential application associated with said at least one secondary virtual server image before associating said at least one replicated virtual server image with said at least one secondary virtual server platform in order to make said at least one secondary virtual server platform available to support execution of an application included in said at least one replicated virtual server image.

2. The system of claim 1 further comprising: a physical storage input/output interface and a virtual input/output channel interfacing said at least one primary virtual server platform with said primary storage area network; and a physical storage input/output interface and a virtual input/output channel interfacing said at least one secondary virtual server platform with said secondary storage area network.

3. The system of claim 1 further comprising: a physical network input/output interface and a virtual network input/output channel interfacing said at least one primary virtual server platform with a network; and a physical network input/output interface and a virtual network input/output channel interfacing said at least one secondary virtual server platform with a network.

4. The system of claim 1 wherein said controller provides an IP address associated with said at least one secondary virtual server platform in place of an IP address associated with said at least one primary virtual server platform to one or more DNS servers.

5. The system of claim 1 wherein said controller comprises a computer executable application including an instance thereof executable on a computer system located at said primary site and an instance thereof executable on a computer system located at said secondary site.

6. The system of claim 1 wherein said control application directs replication of said at least one primary virtual server image to occur synchronously.

7. The system of claim 1 further comprising:

an intermediary site including an intermediary site storage area network, said intermediary site being enabled for data transmission with said primary site and with said secondary site, wherein said control application is operable to direct replication of said at least one primary virtual server image from said primary site to at least one intermediary virtual server image stored on said intermediary site storage area network and subsequent replication of said at least one intermediary virtual server image to said at least one replicated virtual server image on said secondary site storage area network.

8. The system of claim 7 wherein said controller directs replication of said at least one primary virtual server image to said at least one intermediary virtual server image to occur synchronously and replication of said at least one intermediary virtual server image to said at least one replicated virtual server image to occur asynchronously.

9. The system of claim 7 wherein said controller comprises a computer executable application including an instance thereof executable on a computer system located at said primary site, an instance thereof executable on a computer system located at said intermediary site, and an instance thereof executable on a computer system located at said secondary site.

10. The system of claim 1 further comprising: a plurality of primary sites, each said primary site including a primary site storage area network, at least one primary site virtual server platform including physical hardware and server virtualization software, and at least one primary site virtual server, said at least one primary site virtual server at each primary site being implemented as a portable stateless server comprising an encapsulated package established by the server virtualization software, the encapsulated package including application software, operating system software, application data, and information tying the application software, the operating system software and the application data to particular physical hardware of the at least one primary virtual server platform including any NIC identifiers of the physical hardware and any MAC addresses associated therewith, each said at least one primary site virtual server including its own NIC identifier and MAC address and being stored at each primary site as at least one primary virtual server image of the encapsulated package on each said primary storage area network at each primary site, each said at least one primary virtual server image being associated with said at least one primary virtual server platform at each primary site;

wherein said secondary site is enabled for data transmission with each of said primary sites;

wherein said controller is operable to direct replication of each said at least one primary virtual server image from each said primary site to a corresponding replicated virtual server image stored on said secondary site storage area network; and wherein said controller is further operable to monitor operation of each said primary virtual server platform at each primary site and, for each said primary site virtual server platform failure detected, associate a secondary site virtual server platform at said secondary site with said replicated virtual server image corresponding with the primary site virtual server image associated with the failed primary virtual server platform.

11. The system of claim 10 wherein said controller comprises a computer executable application including instances thereof executable on computer systems at each said primary site and an instance thereof executable on a computer system at said secondary site.

12. A method of providing for high availability of information technology system resources and data recovery, said method comprising:

establishing at a primary site at least one primary site virtual server, the primary site having at least one primary virtual server platform including physical hardware and server virtualization software, the at least one primary site virtual server being implemented as a portable stateless server comprising an encapsulated package established by the server virtualization software, the encapsulated package including application software, operating system software, application data, and information tying the application software, the operating system software and the application data to particular physical hardware of the at least one primary virtual server platform including any NIC identifiers of the physical hardware and any MAC addresses associated therewith, the primary site virtual server further including its own NIC identifier and MAC address;

storing the at least one primary site virtual server as at least one corresponding image of the encapsulated package on a storage area network at the primary site;

associating the stored image with at least one primary virtual server platform at the primary site;

replicating the at least one image stored on the storage area network at the primary site on a storage area network at a secondary site, the secondary site including the secondary site storage area network and at least one secondary virtual server platform including physical hardware and server virtualization software;

monitoring operation of at least one primary site virtual server platform; and when a problem is detected with the at least one primary site virtual server platform, performing one or more of the following steps:
re-associating the at least one primary virtual server image with at least one excess virtual server platform if the at least one excess virtual server platform is available, the at least one excess virtual server platform being located at one of the primary and secondary sites and including physical hardware and server virtualization software,
associating the at least one replicated image at the secondary site with the at least one secondary virtual server platform at the secondary site if the at least one excess virtual server platform is not available, and
when said at least one secondary virtual server platform is associated with at least one secondary virtual server implemented as a portable stateless server and stored as at least one secondary virtual server image on the secondary site storage area network, shutting down a non-essential application associated with the at least one secondary virtual server image before associating the at least one replicated virtual server image with the at least one secondary virtual server platform in order to make the at least one secondary virtual server platform available to support execution of an application included in the at least one replicated virtual server image.

13. The method of claim 12 further comprising: interfacing the at least one primary virtual server platform with the primary site storage area network by a physical storage input/output interface and a virtual input/output channel; and
interfacing the at least one secondary virtual server platform with the secondary site storage area network by a physical storage input/output interface and a virtual input/output channel.

14. The method of claim 12 further comprising: interfacing the at least one primary virtual server platform with a network by a physical network input/output interface and a virtual network input/output channel; and
interfacing the at least one secondary virtual server platform with the network by a physical network input/output interface and a virtual network input/output channel.

15. The method of claim 12 further comprising:
providing an IP address associated with the at least one secondary virtual server platform in place of an IP address associated with the at least one primary virtual server platform to one or more DNS servers.

16. The method of claim 12 wherein said step of replicating the at least one image stored on the storage area network at the primary site on a storage area network at a secondary site is performed synchronously.

17. The method of claim 12 wherein said steps of the method are performed at the direction of a computer executable control application, instances of which are executing on computer systems located at the primary site and the secondary site.

18. The method of claim 12 wherein said step of replicating the at least one image stored on the storage area network at the primary site on a storage area network at a secondary site comprises:
synchronously replicating the at least one image stored on the storage area network at the primary site as at least one intermediary image on a storage area network at an intermediary site; and
asynchronously replicating the at least one intermediary image on the storage area network at the intermediary site as the at least one replicated image on the storage area network at the secondary site.

19. The method of claim 18 wherein said steps of the method are performed at the direction of a computer executable control application, instances of which are executing on computer systems located at the primary site, the intermediary site, and the secondary site.

20. The method of claim 12 further comprising: performing said steps of the method for each of a plurality of primary sites.

* * * * *